US011595788B2

(12) United States Patent
Traylor et al.

(10) Patent No.: US 11,595,788 B2
(45) Date of Patent: Feb. 28, 2023

(54) DYNAMIC COLLABORATION IN SOCIAL NETWORKING ENVIRONMENT

(71) Applicant: Cricket Media, Inc., McLean, VA (US)

(72) Inventors: Shawn Traylor, Washington, DC (US); Daniel English, Arlington, VA (US); Linda Dozier, Mammoth Lakes, CA (US); Christopher John Lehnert, Bethesda, MD (US)

(73) Assignee: Cricket Media Services, Inc., McLean, VA (US)

( * ) Notice: Subject to any disclaimer, the term of this patent is extended or adjusted under 35 U.S.C. 154(b) by 0 days.

(21) Appl. No.: 17/528,048

(22) Filed: Nov. 16, 2021

(65) Prior Publication Data

US 2022/0078583 A1    Mar. 10, 2022

Related U.S. Application Data

(63) Continuation of application No. 16/666,299, filed on Oct. 28, 2019, now abandoned, which is a continuation of application No. 12/902,219, filed on Oct. 12, 2010, now abandoned.

(60) Provisional application No. 61/251,187, filed on Oct. 13, 2009.

(51) Int. Cl.
*H04W 4/08*     (2009.01)
*G06Q 10/10*    (2012.01)
*H04L 12/18*    (2006.01)
*H04W 4/21*     (2018.01)

(52) U.S. Cl.
CPC .............. *H04W 4/08* (2013.01); *G06Q 10/10* (2013.01); *H04L 12/1822* (2013.01); *H04W 4/21* (2018.02); *H04M 2203/2044* (2013.01); *H04M 2203/554* (2013.01)

(58) Field of Classification Search
CPC .......... H04W 4/08; H04W 4/21; G06Q 10/10; H04L 12/1822; H04M 2203/2044; H04M 2203/554
See application file for complete search history.

(56) References Cited

U.S. PATENT DOCUMENTS

| | | | |
|---|---|---|---|
| 4,740,912 | A | 4/1988 | Whitaker |
| 5,710,884 | A | 1/1998 | Dedrick |
| 5,740,549 | A | 4/1998 | Reilly et al. |
| 5,761,662 | A | 6/1998 | Dasan |
| 5,768,528 | A | 6/1998 | Stumm |
| 5,772,446 | A | 6/1998 | Rosen |
| 5,813,863 | A | 9/1998 | Sloane et al. |
| 5,907,831 | A | 5/1999 | Lotvin et al. |

(Continued)

FOREIGN PATENT DOCUMENTS

WO      2007/118231      10/2007

OTHER PUBLICATIONS

State Intellectual Property Office of the Peoples' Republic of China, Office Action dated Dec. 30, 2013 in Chinese Application No. 201080056528.0, filed Oct. 12, 2010, ePals, Inc.

(Continued)

*Primary Examiner* — Tadesse Hailu
(74) *Attorney, Agent, or Firm* — Nelson Mullins Riley & Scarborough LLP

(57) ABSTRACT

A method and system for facilitating collaboration between two groups without impairing or affecting the structure of the two groups is provided.

1 Claim, 21 Drawing Sheets

(56) References Cited

U.S. PATENT DOCUMENTS

| | | | |
|---|---|---|---|
| 5,933,498 | A | 8/1999 | Schneck et al. |
| 5,970,231 | A | 10/1999 | Crandall |
| 5,972,875 | A | 10/1999 | Crutcher et al. |
| 5,974,446 | A | 10/1999 | Sonnenreich et al. |
| 5,987,606 | A | 11/1999 | Cirasole et al. |
| 6,020,884 | A | 2/2000 | MacNaughton et al. |
| 6,075,968 | A | 6/2000 | Morris et al. |
| 6,085,229 | A | 7/2000 | Newman et al. |
| 6,105,027 | A | 8/2000 | Schneider et al. |
| 6,157,924 | A | 12/2000 | Austin |
| 6,178,407 | B1 | 1/2001 | Lotvin et al. |
| 6,208,995 | B1 | 3/2001 | Himmel et al. |
| 6,233,618 | B1 | 5/2001 | Shannon |
| 6,249,282 | B1 | 6/2001 | Sutcliffe et al. |
| 6,279,013 | B1 | 8/2001 | LaMarca et al. |
| 6,296,487 | B1 | 10/2001 | Lotecka |
| 6,302,698 | B1 | 10/2001 | Ziv-Ei |
| 6,324,538 | B1 | 11/2001 | Wesinger, Jr. et al. |
| 6,341,960 | B1 | 1/2002 | Frasson et al. |
| 6,363,062 | B1 | 3/2002 | Aaronson et al. |
| 6,370,355 | B1 | 4/2002 | Ceretta et al. |
| 6,374,237 | B1 | 4/2002 | Reese |
| 6,381,444 | B1 | 4/2002 | Aggarwal et al. |
| 6,401,075 | B1 | 6/2002 | Mason et al. |
| 6,438,632 | B1 | 8/2002 | Kikugawa |
| 6,460,036 | B1 | 10/2002 | Herz |
| 6,470,353 | B1 | 10/2002 | Yaung et al. |
| 6,480,885 | B1 | 11/2002 | Olivier |
| 6,554,618 | B1 | 4/2003 | Lockwood |
| 6,560,578 | B2 | 5/2003 | Eldering |
| 6,658,415 | B1 | 12/2003 | Brown et al. |
| 6,684,212 | B1 * | 1/2004 | Day ............... G06Q 10/10 707/999.009 |
| 6,691,106 | B1 | 2/2004 | Sathyanarayan |
| 6,691,153 | B1 | 2/2004 | Hanson et al. |
| 6,704,320 | B1 | 3/2004 | Narvaez et al. |
| 6,718,369 | B1 | 4/2004 | Dutta |
| 6,725,203 | B1 | 4/2004 | Seet et al. |
| 6,741,980 | B1 | 5/2004 | Langseth et al. |
| 6,757,691 | B1 | 6/2004 | Welsh et al. |
| 6,766,362 | B1 | 7/2004 | Miyasaka et al. |
| 6,807,558 | B1 | 10/2004 | Hassett et al. |
| 6,825,945 | B1 | 11/2004 | Silverbrook et al. |
| 6,826,534 | B1 | 11/2004 | Gupta et al. |
| 6,842,773 | B1 | 1/2005 | Ralston et al. |
| 6,845,273 | B1 | 1/2005 | Taylor |
| 6,892,226 | B1 | 5/2005 | Tso et al. |
| 6,920,617 | B2 | 7/2005 | Nitta |
| 6,954,783 | B1 | 10/2005 | Bodwell et al. |
| 6,973,462 | B2 | 12/2005 | Dattero et al. |
| 6,988,839 | B1 | 1/2006 | Yu |
| 7,031,651 | B2 | 4/2006 | McCormick et al. |
| 7,032,022 | B1 | 4/2006 | Shanumgam et al. |
| 7,035,926 | B1 | 4/2006 | Cohen et al. |
| 7,120,590 | B1 | 10/2006 | Eisen et al. |
| 7,127,741 | B2 | 10/2006 | Bandini et al. |
| 7,162,522 | B2 | 1/2007 | Adar et al. |
| 7,328,216 | B2 | 2/2008 | Hofmann et al. |
| 7,464,147 | B1 | 12/2008 | Fakhouri et al. |
| 7,577,665 | B2 | 8/2009 | Ramer et al. |
| 7,640,336 | B1 | 12/2009 | Lu et al. |
| 7,676,542 | B2 * | 3/2010 | Moser ............... G06Q 10/107 709/204 |
| 7,765,481 | B2 | 7/2010 | Dixon et al. |
| 2001/0037367 | A1 * | 11/2001 | Iyer ............... H04L 67/131 709/204 |
| 2001/0037407 | A1 | 11/2001 | Dragulev et al. |
| 2002/0013836 | A1 | 1/2002 | Friedman et al. |
| 2002/0038246 | A1 | 3/2002 | Nagaishi |
| 2002/0040374 | A1 | 4/2002 | Kent |
| 2002/0049806 | A1 | 4/2002 | Gatz et al. |
| 2002/0064767 | A1 | 5/2002 | McCormick et al. |
| 2002/0076025 | A1 | 6/2002 | Liversidge et al. |
| 2002/0100808 | A1 | 8/2002 | Norwood et al. |
| 2002/0119434 | A1 | 8/2002 | Beams et al. |
| 2002/0123334 | A1 | 9/2002 | Borger et al. |
| 2002/0140732 | A1 | 10/2002 | Tveskov |
| 2002/0161770 | A1 | 10/2002 | Shapiro et al. |
| 2002/0169782 | A1 | 11/2002 | Lehmann et al. |
| 2002/0169954 | A1 | 11/2002 | Bandini et al. |
| 2002/0174230 | A1 | 11/2002 | Gudorf et al. |
| 2002/0184092 | A1 | 12/2002 | Cherry et al. |
| 2003/0029911 | A1 | 2/2003 | Kitayama |
| 2003/0050986 | A1 | 3/2003 | Matthews et al. |
| 2003/0093518 | A1 | 5/2003 | Hiraga |
| 2003/0110215 | A1 | 6/2003 | Joao |
| 2003/0164849 | A1 | 9/2003 | Barrie et al. |
| 2003/0207245 | A1 | 11/2003 | Parker |
| 2004/0001087 | A1 | 1/2004 | Warmus et al. |
| 2004/0014017 | A1 | 1/2004 | Lo |
| 2004/0030781 | A1 | 2/2004 | Etesse et al. |
| 2004/0039814 | A1 | 2/2004 | Crabtree et al. |
| 2004/0049554 | A1 | 3/2004 | Watanabe |
| 2004/0064515 | A1 | 4/2004 | Hockey |
| 2004/0103118 | A1 | 5/2004 | Irving et al. |
| 2004/0103122 | A1 | 5/2004 | Irving et al. |
| 2004/0103137 | A1 | 5/2004 | Irving et al. |
| 2004/0104933 | A1 * | 6/2004 | Friedrich ............... G06Q 10/10 715/751 |
| 2004/0111423 | A1 | 6/2004 | Irving et al. |
| 2004/0122692 | A1 | 6/2004 | Irving et al. |
| 2004/0128624 | A1 | 7/2004 | Arellano et al. |
| 2004/0145770 | A1 | 7/2004 | Nakano et al. |
| 2004/0167794 | A1 | 8/2004 | Shostack |
| 2004/0174392 | A1 * | 9/2004 | Bjoernsen ............... G06Q 10/10 715/751 |
| 2004/0186738 | A1 | 9/2004 | Reisman |
| 2004/0205578 | A1 | 10/2004 | Wolff et al. |
| 2005/0014121 | A1 | 1/2005 | Eck et al. |
| 2005/0033657 | A1 | 2/2005 | Herrington et al. |
| 2005/0071328 | A1 | 3/2005 | Lawrence |
| 2005/0079477 | A1 | 4/2005 | Diesel et al. |
| 2005/0105134 | A1 | 5/2005 | Moneypenny et al. |
| 2005/0165743 | A1 | 7/2005 | Bharat et al. |
| 2005/0166143 | A1 | 7/2005 | Howell |
| 2005/0216336 | A1 | 9/2005 | Roberts et al. |
| 2005/0227216 | A1 | 10/2005 | Gupta |
| 2005/0240580 | A1 | 10/2005 | Zamir et al. |
| 2005/0251494 | A1 | 11/2005 | Maria Jansen |
| 2005/0288943 | A1 | 12/2005 | Wei et al. |
| 2006/0031087 | A1 | 2/2006 | Fox et al. |
| 2006/0062157 | A1 | 3/2006 | Yamamoto |
| 2006/0115800 | A1 | 6/2006 | Daley |
| 2006/0134593 | A1 | 6/2006 | Kalous et al. |
| 2006/0242581 | A1 | 10/2006 | Manion et al. |
| 2006/0246197 | A1 | 11/2006 | Kshirsagar et al. |
| 2006/0248197 | A1 | 11/2006 | Evans et al. |
| 2006/0252547 | A1 | 11/2006 | Mizrahi et al. |
| 2006/0253533 | A1 | 11/2006 | Bursztein et al. |
| 2006/0253572 | A1 | 11/2006 | Gomez et al. |
| 2007/0027973 | A1 | 2/2007 | Stein et al. |
| 2007/0130339 | A1 | 6/2007 | Alcorn et al. |
| 2007/0224585 | A1 | 9/2007 | Gerteis et al. |
| 2007/0231782 | A1 | 10/2007 | Ozawa et al. |
| 2007/0245349 | A1 | 10/2007 | Sinn |
| 2007/0260671 | A1 | 11/2007 | Harinstein et al. |
| 2008/0082480 | A1 | 4/2008 | Gounares et al. |
| 2009/0030876 | A1 | 1/2009 | Hamilton |
| 2009/0094039 | A1 | 4/2009 | MacDonald et al. |

OTHER PUBLICATIONS

European Patent Office, "Supplementary European Search Report," dated Feb. 18, 2013, dated Feb. 26, 2013.

Patent Cooperation Treaty ISA/US, PCT Written Opinion of the International Searching Authority, and International Search Report, date of completion: Nov. 16, 2010, dated Dec. 2, 2010, PCT International Application No. PCT/US10/52251, filed Oct. 12, 2010, Applicant: ePALS, Inc.

The International Bureau of WIPO, Geneva, Switzerland, PCT International Preliminary Report on Patentability, date of completion: Nov. 16, 2010, dated Apr. 26, 2012, PCT International Appli-

(56) References Cited

OTHER PUBLICATIONS cation No. PCT/US10/052251, filed Oct. 12, 2010, Applicant: ePALS, Inc. et al.
Ashley Lowery, Internet Neighborhood ePALS links world with Edwardsburg, South Bend Tribune, Mar. 14, 2001.
EPALS Classroom Exchange First to Provide Teacher Monitored Email With Instant Language Translations, PR Newswire, Mar. 14, 2000.
EPALS Classroom Exchange partners with Canada's SchoolNet, Canada NewsWire, Nov. 23, 2000.
MessageLabs: British Government Takes on MessageLabs to Bolster Virus Protection, M2 Presswire, May 16, 2002.
Netopia: Netopia to bring parental control, content filtering and family security services to broadband service providers, M2 Presswire, Jun. 4, 2002.
Portions of http://www.ecs.syr.edu/organizations/AEW/ website and associated Internet Archive information.
Safety: Monitoring web access, The Guardian, Oct. 25, 2000, at 7.
Scholastic and ePALS Classroom Exchange Announce Agreement Connecting Global Classrooms, Business Wire, Aug. 10, 2000.
Zoraini Wati Abas, E-mail activities in the classroom, Computimes Malaysia, Apr. 26, 2001.
Portions of the file history of Patent Cooperation Treaty (PCT) international patent application No. PCT/US10/52251.

\* cited by examiner

FROM FIG. 4A-1 pat.
Posted 23 minutes ago.Comment

Sue Smith commented on {Blog Post Title}:
Lorem ipsum dolor sit amet, consectetuer adipiscing elit, sed diam nonummy nibh euismod tincidunt ut laoreet dolore magna aliquam erat volutpat.
Posted 23 minutes ago.Comment

404

Ljeborgsskolan has started collaborating on the Diversity Project with William H Taylor School
Posted 23 minutes ago Sue Smith posted an In2Books review on {Book Title}:
Lorem ipsum dolor sit amet, consectetuer adipiscing elit, sed diam nonummy nibh euismod tincidunt ut laoreet dolore magna aliquam erat volutpat.
Posted 23 minutes ago.Comment Show more| >>>

© 2009 ePals, Inc. All rights reserved. ePals, In2Books, ePal and other related logos and trademarks appearing on this site are trademarks of ePals, Inc.
Home | Content | Projects | Community | In2Books | Language Learning Centers | Help | Register
About ePals | Terms of Use | Privacy Policy | Advertise With Us | Contact Us

EPALS BRANDING

HOME  CONTENT▼  PROJECTS▼  GROUPS▼  IN2BOOKS  LANGUAGE CENTERS  SchoolMail Inbox (12)

English ▼  Welcome, Jenny | Sign Out | Settings | Help

Search Projects ▼ [          ]  SEARCH  Advanced

GROUP Cold Harbour C of E School

United Kingdom

Lorem ipsum dolor sit amet, consectetuer adipiscing elit, sed diam nonummy nibh euismod tincidunt ut laoreet dolore magna aliquam erat volutpat. Lorem ipsum dolor sit amet, consectetuer adipisci...read more About
Projects
Members
Blog
Photos
Videos
Documents
Favorites
Settings

[~] Start a Conversation
[+] Add as a Friend
[ ] Invite to Collaborate

Invite to Collaborate  1100
Invitation sent. Thank you.

[ Close ]

300 x 250 AD

Lilieborgsskolan has started collaborating on the Diversity Project with William H Taylor School
Posted 23 minutes ago Kim Le posted a video for the Apollo Moon Landing Project:
Posted 23 minutes ago. Comment Video Title
Lorem ipsum dolor sit amet, consectetuer adipiscing elit Posted 23 minutes ago. Comment Sue Smith posted an In2Books review on (Book Title):
Lorem ipsum dolor sit amet, consectetuer adipiscing elit, sed diam nonummy nibh euismod tincidunt ut laoreet dolore magna aliquam erat volutpat.
Posted 23 minutes ago. Comment Sue Smith commented on (Blog Post Title):
Lorem ipsum dolor sit amet, consectetuer adipiscing elit, sed diam nonummy nibh euismod tincidunt ut laoreet dolore magna aliquam erat volut- Members (234)

View All >>>

Language Learning Centers
Meet and learn from other native speakers from around the world!

FROM FIG. 15A pat.
Posted 23 minutes ago.Comment

Sue Smith commented on {Blog Post Title};
Lorem ipsum dolor sit amet, consectetuer adipiscing elit, sed diam nonummy nibh euismod tincidunt ut laoreet dolore magna aliquam erat volutpat.
Posted 23 minutes ago.Comment 1510 — Liljeborgsskolan has started collaborating on the Diversity Project with William H Taylor School
Posted 23 minutes ago Sue Smith posted an In2Books review on {Book Title};
Lorem ipsum dolor sit amet, consectetuer adipiscing elit, sed diam nonummy nibh euismod tincidunt ut laoreet dolore magna aliquam erat volutpat.
Posted 23 minutes ago.Comment © 2009 ePals, Inc. All rights reserved. ePals, In2Books, ePal and other related logos and trademarks appearing on this site are trademarks of ePals, Inc.
Home | Content | Projects | Community | In2Books | Language Learning Centers | Help | Register
About ePals | Terms of Use | Privacy Policy | Advertise With Us | Contact Us

Home  Profile  Groups  FAQs  Inbox  Search  Control Panel

Create a Group

Name
Enter a name for the Group. This will be used to format the URL to access your group.

Description
Describe your group here. You can insert media(video) and other items to help.

[ B I U ... Paragraph ]

Group Type
Should the new group be public or private?
○ Public (Closed Membership)
Everyone can read your group, it is listed publically, and users must be approved before becoming group members.
● Private (Listed)
Only members can read your group, it is listed publically (title and description), and users must be approved before becoming group members

Project Group Collaboration
Do you want this group to be available to collaborate with other groups? You can change this at any time in by choosing "Edit Group" from your Group's main page.
● Yes (Available to collaborate)
○ No (Unavailable to collaborate)

*Selecting "Only Some Projects" radio button leaves all boxes checked by default, but unlocks all boxes below*

Project Group Collaboration Options
Which projects are you interested in having your group collaborate on? You can change this at any time in by choosing "Edit Group" from your Group's main page.
○ All Projects
● Only Selected Projects ☑ Project 1  Learn more
☐ Project 2  Learn more
☐ Project 3  Learn more
☑ Project 4  Learn more

*Project 1
In Project 5 description overview short blurb. In Project 5 description overview short blurb. In Project 5 description overview short blurb. In Project 5 description overview short blurb. In Project 5 description overview short blurb.*

*Clicking Learn More opens new tab/window with project synopsis*

Forum Options

Enable Forum ☑  *User can toggle check/uncheck by clicking these boxes*
When enabled, a f

Enable Forum Moderation ☐
When enabled, new forum posts from members will need to be approved before they are visible.

Allowed Thread Types
Select the types that are allowed to be used for new threads in this forum.
☐ Question and Answer
☑ Discussion

Default new threads to [ Discussion ⇕ ]
Select the thread type that you want new threads to default to.

Members can Create Threads ☑
When enabled, members are able to start new threads or discussion topics.

Blog Options

Enable Blog ☑

Shortcuts
Create a new Group
All Groups
Groups Administration

Recently Updated Groups

Kids and Math | new educator as on 20th october | MYP Event 2 - Librarianship

Test Role Change | Educator group by vinay | 123434

123434 | 123434 | Collaboration with vacation

My favorite Vacation

*Hovering over any project name gives a tool tip with a brief description of that project*

(c) ePals, Inc.

FIG. 19

DYNAMIC COLLABORATION IN SOCIAL NETWORKING ENVIRONMENT

COPYRIGHT NOTICE

A portion of the disclosure of this patent document contains material which is subject to (copyright or mask work) protection. The (copyright or mask work) owner has no objection to the facsimile reproduction by anyone of the patent document or patent disclosure, as it appears in the Patent Office patent file or records, but otherwise reserves all (copyright or mask work) rights whatsoever.

CROSS-REFERENCE TO RELATED APPLICATIONS

This a continuation of U.S. patent application Ser. No. 16/666,299, filed on Oct. 28, 2019, which is a continuation of U.S. patent application Ser. No. 12/902,219, filed on Oct. 12, 2010 (abandoned), which claims the benefit of U.S. Provisional Patent Application No. 61/251,187, filed on Oct. 13, 2009, the entire disclosures of which are hereby incorporated by reference herein.

FIELD OF THE INVENTION

The present invention relates generally to social networking. More particularly, the present invention relates to dynamic collaboration in a social networking environment.

BACKGROUND OF THE INVENTION

Social networking sites, such as FACEBOOK, NING, and MYSPACE, do not allow two groups to collaborate in a manner similar to the way groups would collaborate in a non-electronic manner. For instance, groups cannot enter into a distinct collaboration group without fundamentally modifying the constituent groups. The existing paradigm for online collaboration only creates a semblance of collaboration by simply adding users of one group to another group. The result is merely an expansion of one or both groups rather than a focused collaboration that runs parallel to its constituent groups.

The current paradigm as described above exhibits several drawbacks: Problem 1—The addition of users from one group into the other merely expands membership of a group, but does not create a dedicated group focused on a particular collaboration. Problem 2—The addition of new users to an existing group for the sake of a particular collaboration (rather than to be a part of the broader activities of that group) fundamentally alters and arguably dilutes the original group. Problem 3—Adding outside parties to a group is often inappropriate where group membership in the online group is based on real world relationships. For example, a high school classroom would not allow individuals who are not part of the real world class to join the virtual world classroom group for the sake of collaborating with them. Even two classrooms in the same school that want to collaborate on a project would most likely not choose to simply become a single, larger class.

SUMMARY OF THE INVENTION

The present invention recognizes and addresses some of the foregoing considerations, and others, of prior art construction and methods by giving owners of user groups in social networking contexts the ability to invite one another to create a distinct collaboration group that exists outside of each of the constituent groups. In one embodiment, the system automatically adds the members of each group to the collaboration group and provides the owners of the underlying groups to invite additional users to the group. Alternatively, the owners, now co-owners of the newly created collaboration group, can invite or add members of their own constituent groups to the new collaboration group. The new collaboration group has a life of its own outside of the groups whose owners and members founded and seeded it.

In this regard, one aspect of the present invention provides a system and method for facilitating collaboration by a first group and a second group comprising the steps of creating a collaboration group, where a processing device stores data representative of the collaboration group in a memory operatively connected to the processing device; linking the first group to the collaboration group, where the processing devices stores data in the memory representative of the link between the first group and the collaboration group; linking the second group to the collaboration group, where the processing device stores data in the memory representative of the link between the second group and the collaboration group in the memory; and facilitating collaboration by the first and second groups, where a first structure of the first group remains unchanged by the collaboration and a second structure of the second group remains unchanged by the collaboration.

Another aspect of the present invention recognizes that a group owner requires control over whether, at any given time, the owner's group is made available to receive an invitation for a joint collaboration from another group owner. This aspect of the present invention further recognizes that a group owner may be interested in collaborating on one project but not on another. Therefore, group owners have the ability to enable or disable the collaboration feature. If enabled, the group owner may designate whether the group is interested in collaborating on any project or rather on any number of specific projects. These decisions may be made either at the time of group creation or subsequently through the Edit Group function, as described below. Changes to these settings made by the group owner do not affect any unanswered invitations sent or received prior to the change. That is, if the group owner receives an invitation to collaborate on one day at which time the group is configured to accept collaboration invitations, the group owner may accept that invitation. The process then proceeds in the normal scenario even if the settings had been altered to make the group unavailable for collaboration in the meantime. Additionally, a group owner's ability to send a collaboration invitation to another group owner is not affected by the own group's collaboration settings.

Once created, collaboration groups are groups similar to the constituent groups of which each collaboration group is comprised, although users may see collaboration groups as a distinct group type. Recognizing this, one aspect of the present invention applies a distinct "collaboration group" group type to collaboration groups, thereby allowing the system to display them in a distinct or separate list, rather than in a combined list of collaboration and non-collaboration groups. In an effort to enhance the user experience, lists such as "My Groups" and "My Collaboration Groups" can be placed on relevant web pages such as each user's home page.

Aside from the manner by which they are created, another key distinction between collaboration groups and other groups is that online collaboration groups may have a fixed duration—a defined ending point—similar in nature to non-online-enabled collaboration groups. While this may be a characteristic of all group types, it is more prominent with collaboration groups. Therefore, collaboration group co-owners possess the ability to set "active until" dates for these groups. When this date approaches, the system alerts the co-owners and provides them with the opportunity to extend the date if desired.

Finally, collaboration groups, by their nature, may act as a collection point, a container, for the artifacts of the collaboration. For instance, the collaboration group's blogs, wikis, forums, media galleries, etc. may be filled with images, videos, thoughts, produced written works, etc. that constitute the work product of the collaborative effort. Furthermore, this work product may provide lasting value not only to the members of the collaboration group, but also to a broader community of users. As a result, an aspect of the present invention allows co-owners of the collaboration group to archive the collaboration group in a read-only state once the collaboration has finished. The co-owners may then decide whether the archived read-only version may be accessed by (a) the co-owners only, (b) the co-owners and members of the collaboration group, or (c) any user in the system.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 3 through 19 are displays of exemplary graphical user interfaces configured to facilitate the process of group collaboration illustrated by FIG. 2 in accordance with an embodiment of the present invention.

Figure 1:
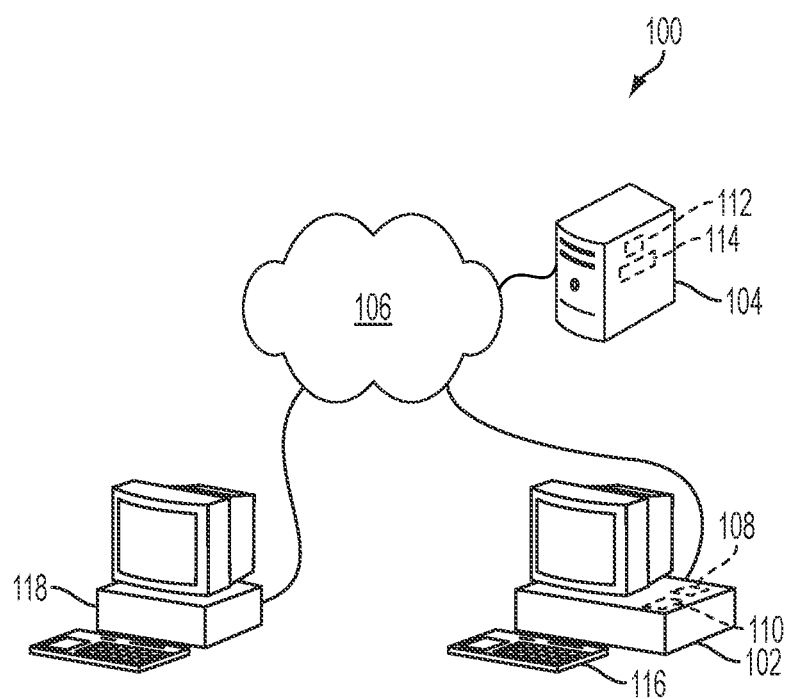
FIG. 1 is a partially schematic diagram of a system for group collaboration in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Collaboration between user-created groups in social networking applications has never been fully realized in a way that mimics the way groups collaborate in the offline world. In the offline world, when two groups collaborate, they do so within the context of a distinct collaboration—that is, around an event or a project—and the life of the collaboration is often shorter than the life of one or both constituent groups. Each of the component groups continues to exist as a fixed, bounded entity with its own goals, activities, members, and leaders. For example, a group, such as the American Cancer Society, and a group, like the Livestrong Foundation, may join in order to collaborate on an event promoting Men's Cancer Awareness Week. Leaders of each of these groups are likely to act as leaders of the Cancer Awareness Week initiative, and members of each of the constituent organizations will fill in the ranks of the collaboration. However, in this representative case outside the offline world, neither the American Cancer Society nor the Livestrong Foundation is forced to fundamentally alter its own leadership, membership, focus, or activities—they exist unmolested and able to co-exist alongside the collaboration without being consumed by it.

Referring to FIG. 1, system 100 comprises at least one computer 102 operatively connected to a server 104 via a wide area network ("WAN") 106, such as the Internet. Computer 102 comprises a processing device 108 and memory 110. Likewise, server 104 comprises a processing device 112 and memory 114. It should be understood that computer 102 and server 104 may comprise additional components, including input devices such as a keyboard 116. Those of ordinary skill in the art should appreciate that computer 102 may be replaced by a mobile device, such as a cellular phone or personal data assistant, comprising its own processing device and memory. It should be further understood that system 100 may comprise additional components, such as one or more of computer 118.

Either of processing devices 108 and 112 may be a processor, microprocessor, controller, microcontroller, or other circuitry. Memory 110 and 114 may be any type of memory or computer-readable medium as long as it is capable of being accessed by respective processing devices 108 and 112, including random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium, in existence now or hereafter, that may be used to carry or store computer program code in the form of computer-executable programs, instructions, or data. Each of processing devices 108 and 112 may also include a portion of memory accessible only to the processing device, commonly referred to as "cache."

Each of memories 110 and 114 comprises computer-executable program code or instructions that when executed by the respective processing device perform one or more steps of the processes described in more detail below and as shown in the attached figures. Additionally, when executed by the respective processing device, the computer-executable program code or instructions display one or more of the exemplary graphical user interfaces described below and shown in the attached figures. Each of memories 110 and 114 may also comprise one or more data structures for storing information. The computer-executable program code or instructions in this scenario, as should be known to those skilled in the art, usually include one or more application programs, other program modules, program data, firmware, and/or an operating system. Computer-executable program code or instructions may also be stored within the cache of processing devices 108 and 112.

Figure 2:
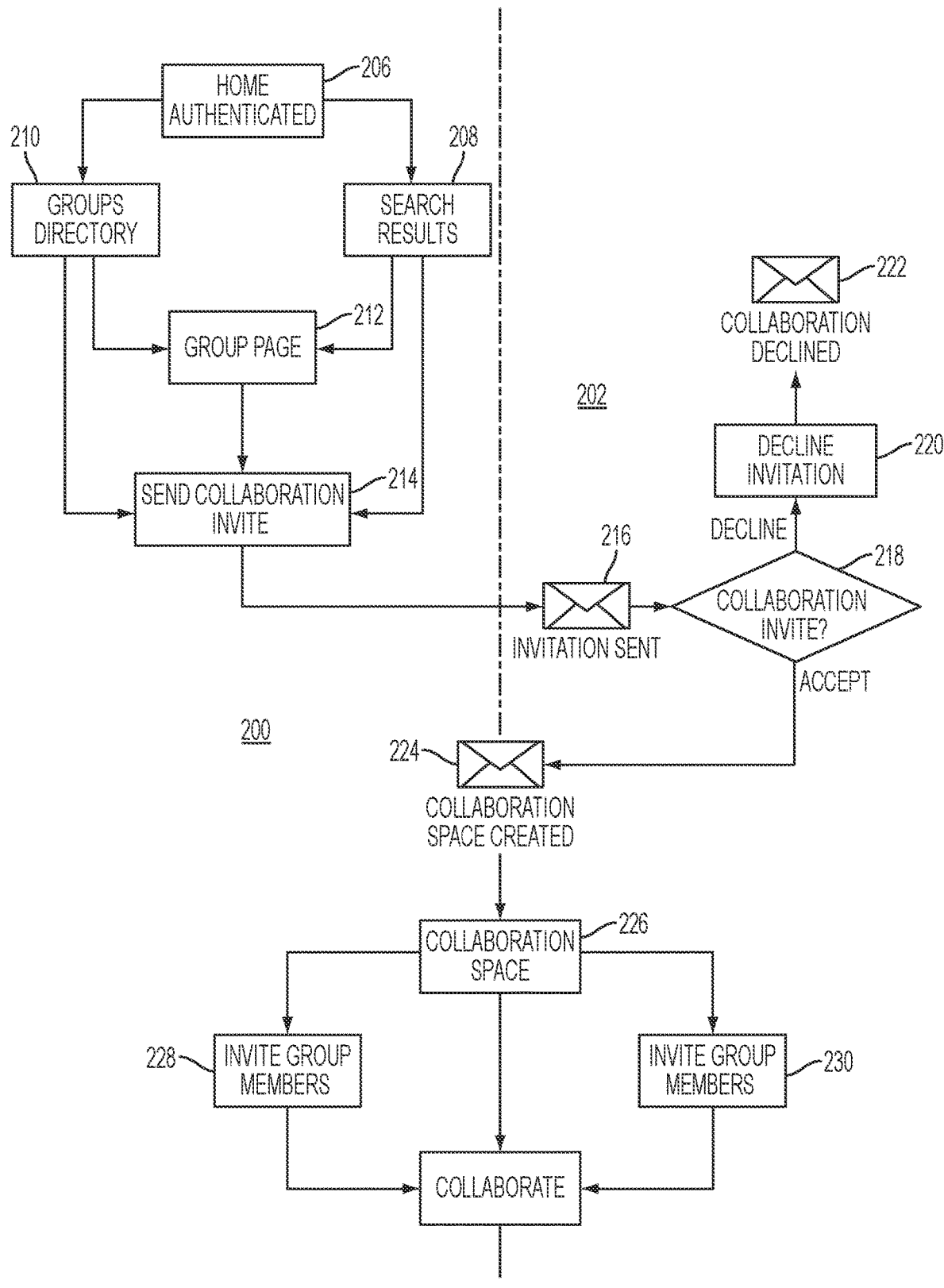
FIG. 2 is a diagram illustrating an exemplary process for group collaboration in accordance with an embodiment of the present invention.

FIG. 2 illustrates an exemplary process for group collaboration in accordance with an embodiment of the present invention. The process involves the actions of a first user tasked with the administration of a first group ("Group A") and the actions of a second user tasked with the administration of a second group ("Group B"). Referring additionally to FIG. 1, the actions performed by the first user are effected by computer 102, while the actions performed by the second user are effected by computer 118. As explained below, server 104 accomplishes certain tasks, as well. Those of ordinary skill in the art should appreciate that all the actions described below may be performed by a single computer or server. That is, it should be understood that either computer 102 or server 104 may carry out all the actions described below. Additionally, side 200 of FIG. 2 represents some of the actions performed by the first user, while side 202 represents some of the actions performed by the second user. Reference is also made to FIGS. 3 through 18 throughout the following description of the actions performed by each user in order to provide examples of a graphical user interface ("GUI") configured to facilitate each action.

At step 206, the first user (also referred to as "Group A Owner") logs into system 100, which may include logging into and being authenticated by a webpage configured for use by the first user and hosted by server 104. The first user then searches for another group. This may be accomplished by searching for the other group using a search engine at step 208 or by browsing for another group using a group directory at step 210.

Figure 3A:
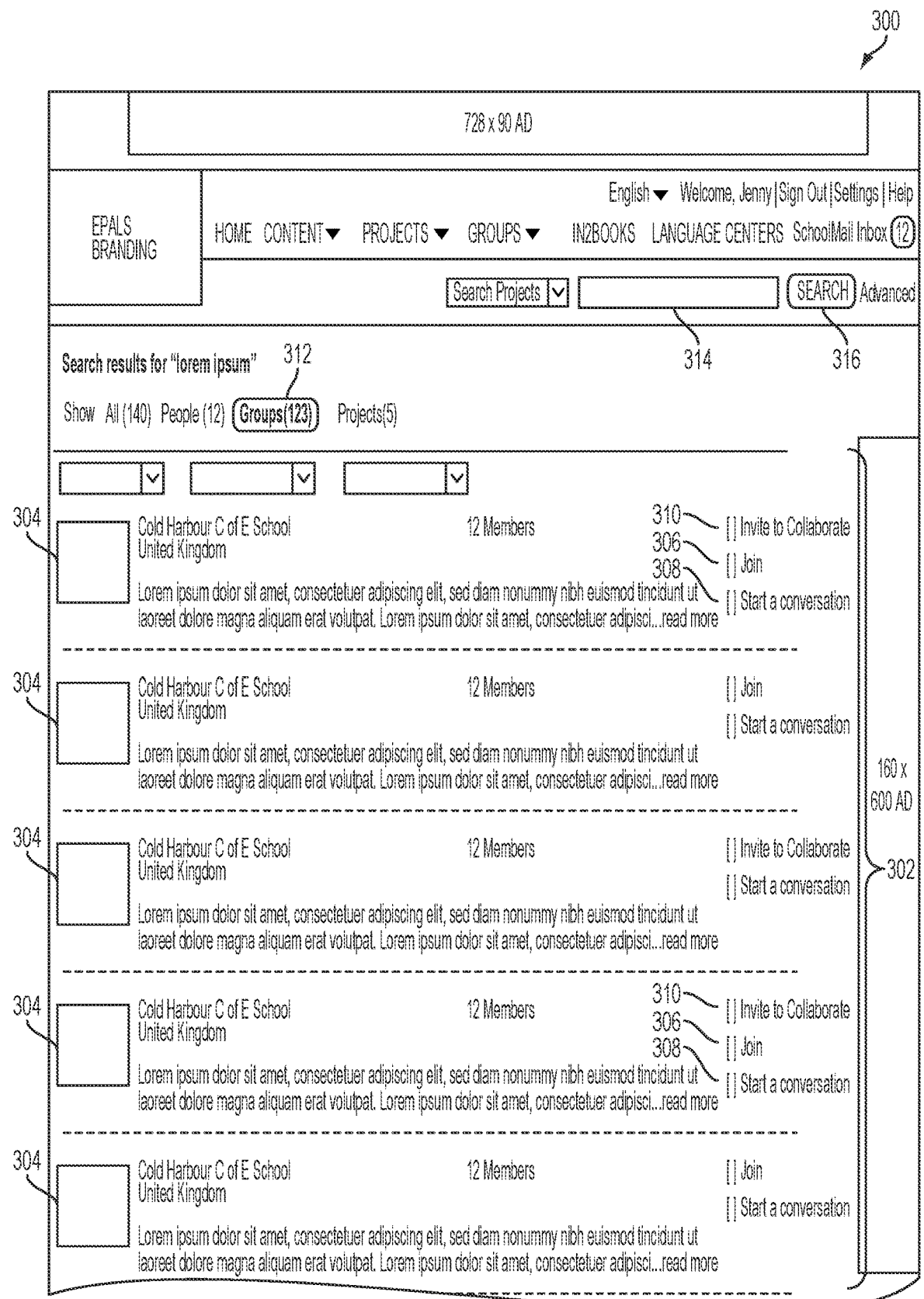
Figure 3B:
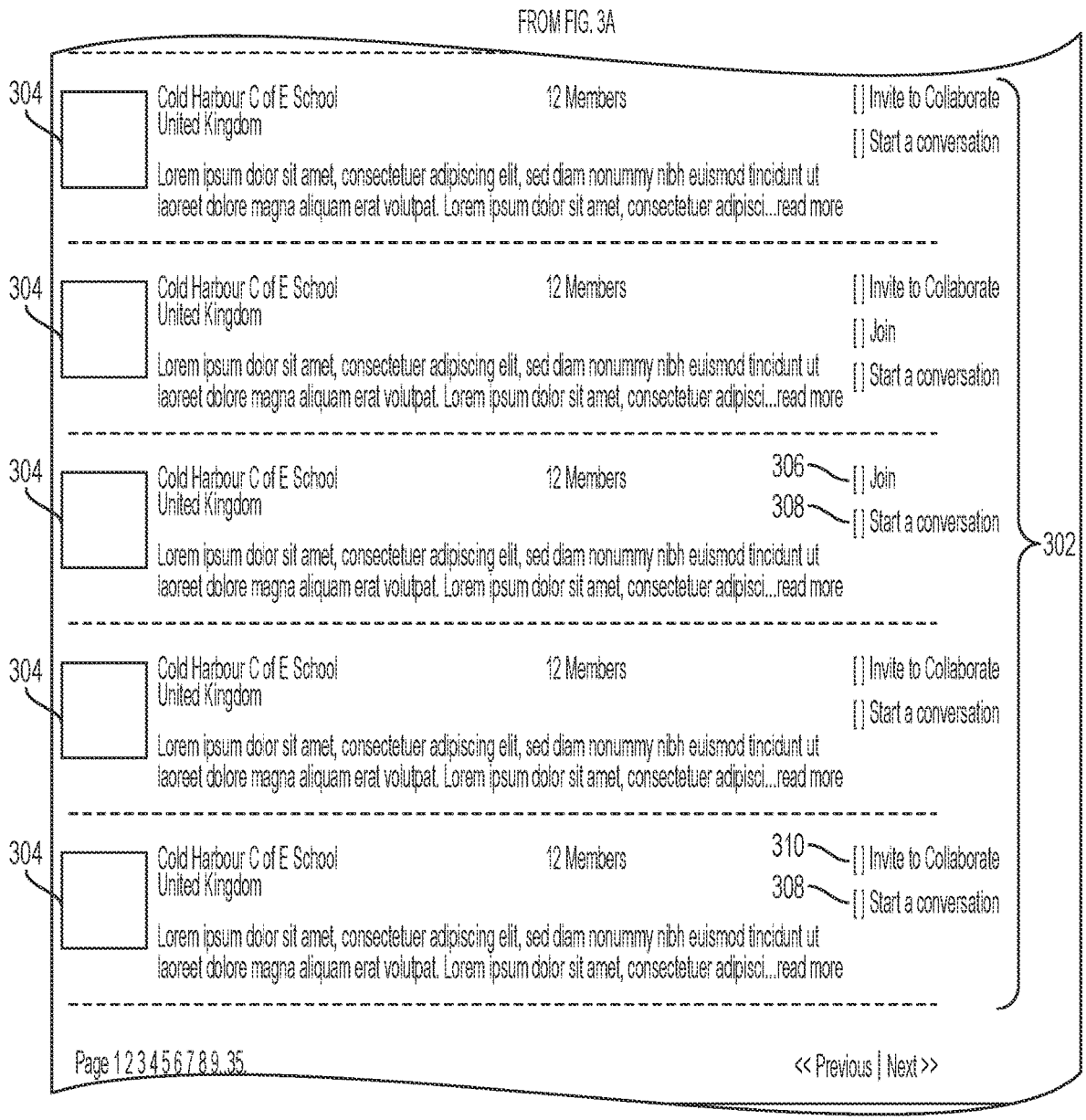
Figures 1, 4A:
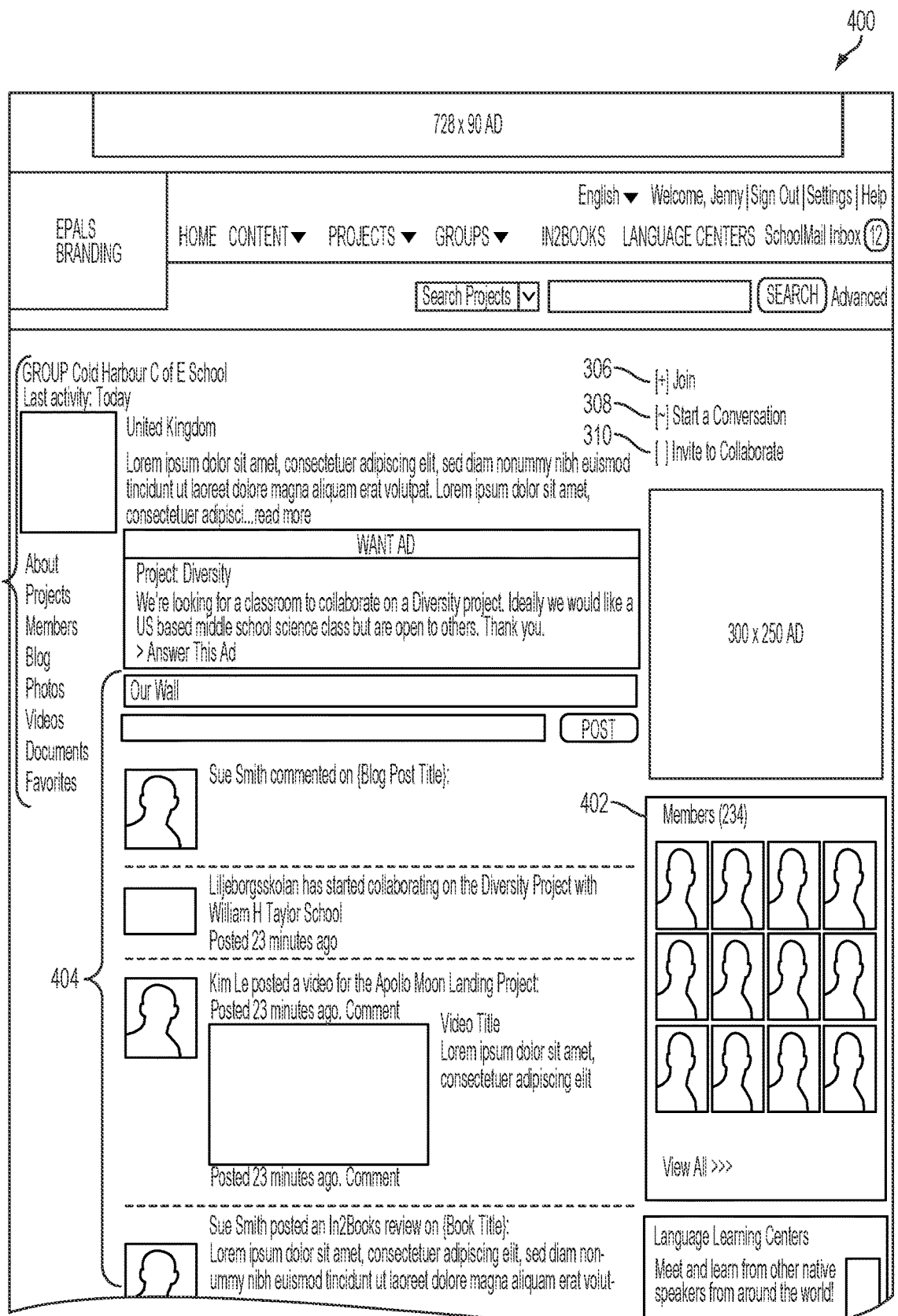

FIG. 3 (which includes and extends across FIGS. 3A and 3B) illustrates an exemplary GUI 300 displaying the results of a search performed to identify possible groups with which to collaborate. GUI 300 comprises a results area 302 setting forth the members or groups corresponding to the search performed by the first user. The results area 302 comprises at least one result 304 that identifies a member or group. Each individual result 304 comprises one or more buttons or hyperlinks, which allow the first user to join a group (via hyperlink 306), start a conversation with the user or group owner represented by the result (via hyperlink 308) or invite the member or group to collaborate (via hyperlink 310). In this embodiment, the user has narrowed the results of the search to groups only by selecting a group selection area 312. Additionally, the user may perform another search for other groups by entering the applicable search terms into a search box 314 and activating a search button 316.

In this example, the first user locates the group administered by the second user (also referred to as "Group B Owner"). At step 212, system 100 displays Group B's main page to the first user via computer 102. In this regard, FIG. 4A (which includes and extends across FIGS. 4A-1 and 4A-2) illustrates an exemplary GUI 400 for displaying a webpage associated with a specific group. GUI 400 may be accessed in a number of ways. For example, the GUI 400 associated with a specific group may be accessed when the corresponding group result 304 is selected from search results area 302 of FIG. 3 or selected from the group director at step 210. GUI 400 provides information about the selected group, such as identifying its members in a member list area 402, setting forth the recent discussions made by the group in a group discussion area 404, and displaying the name and other information about the group in a group information area 406. GUI 400 may comprise other areas, such as an invitation or project request area 408 where the group may request other members or groups to participate in a project or collaboration group. GUI 400 also includes hyperlinks or buttons 306, 308, and 310, as described above.

Figure 4B:
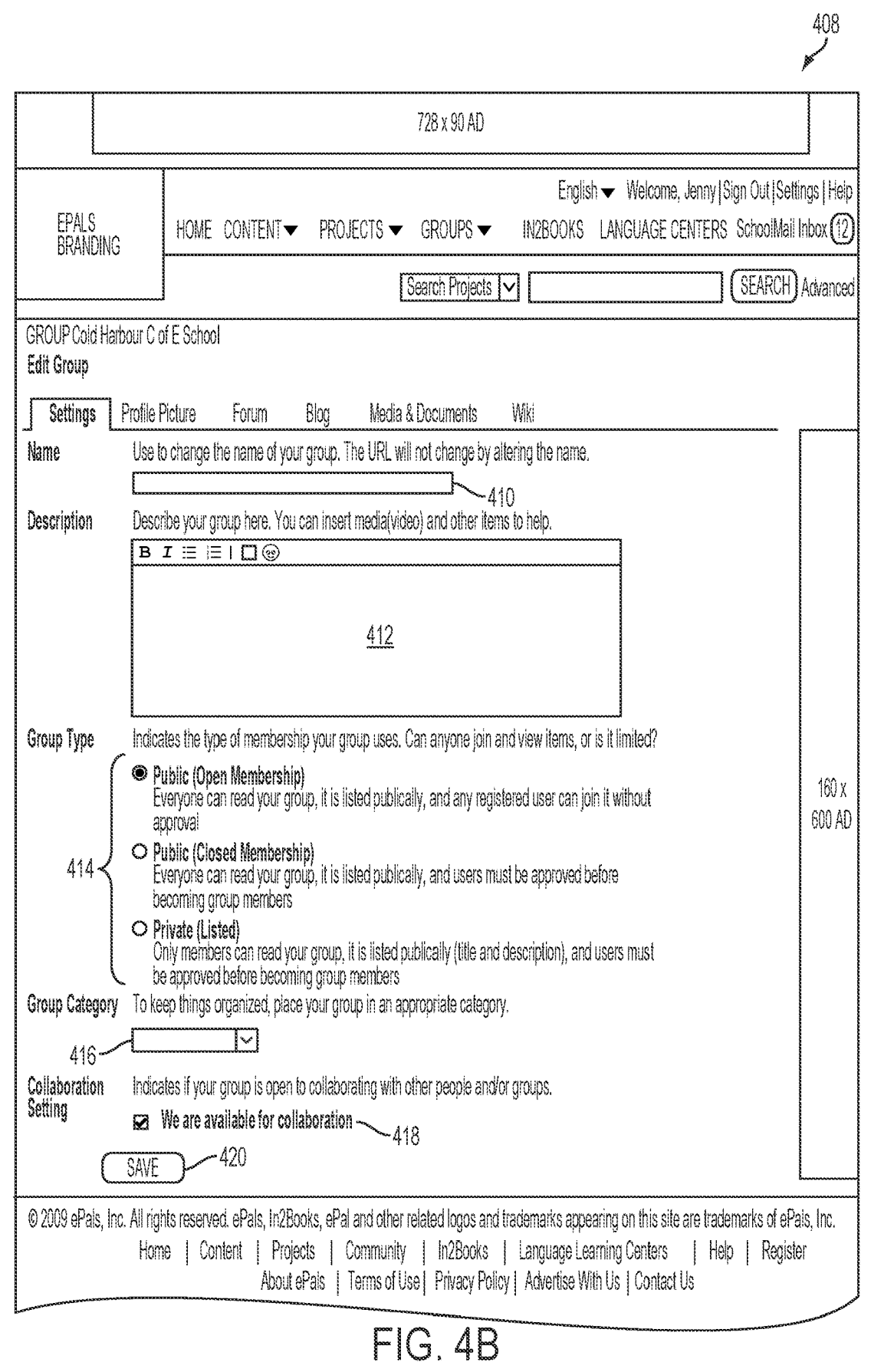

FIG. 4B illustrates an exemplary GUI 408 configured to allow a user tasked with administration of a group to configure or change the group's settings. GUI 408 comprises a name box 410, a description box 412, a type selection radio group 414, a group category dropdown 416, a collaboration setting 418, and a save button 420. The user may change the title of the group using name box 410 and may change the description of the group by using description box 412. Using type selection radio group 414, the user can decide whether the group is public or private. That is, the user may select whether the group is "open membership" (allowing any user registered with system 100 to join the group), "closed membership" (allowing any registered user to view the group but requiring each user to be approved before joining the group), or "private" (preventing any users other than members of the group to access the group page and requiring each user to be approved before joining the group) via radio group 414. The user may assign the group to a category by selecting an applicable category from category dropdown 416. Categories allow a user to organize a collaboration group by topic, such as "animal preservation," corresponding or relating to a topic or interest of the collaboration group. In a preferred embodiment, the user can decide whether the group is available to collaborate with other groups and/or users in a collaboration group or project by selecting collaboration setting 418. Any changes the user makes to the group's settings or profile are saved when the user activates save button 420.

Figure 5:
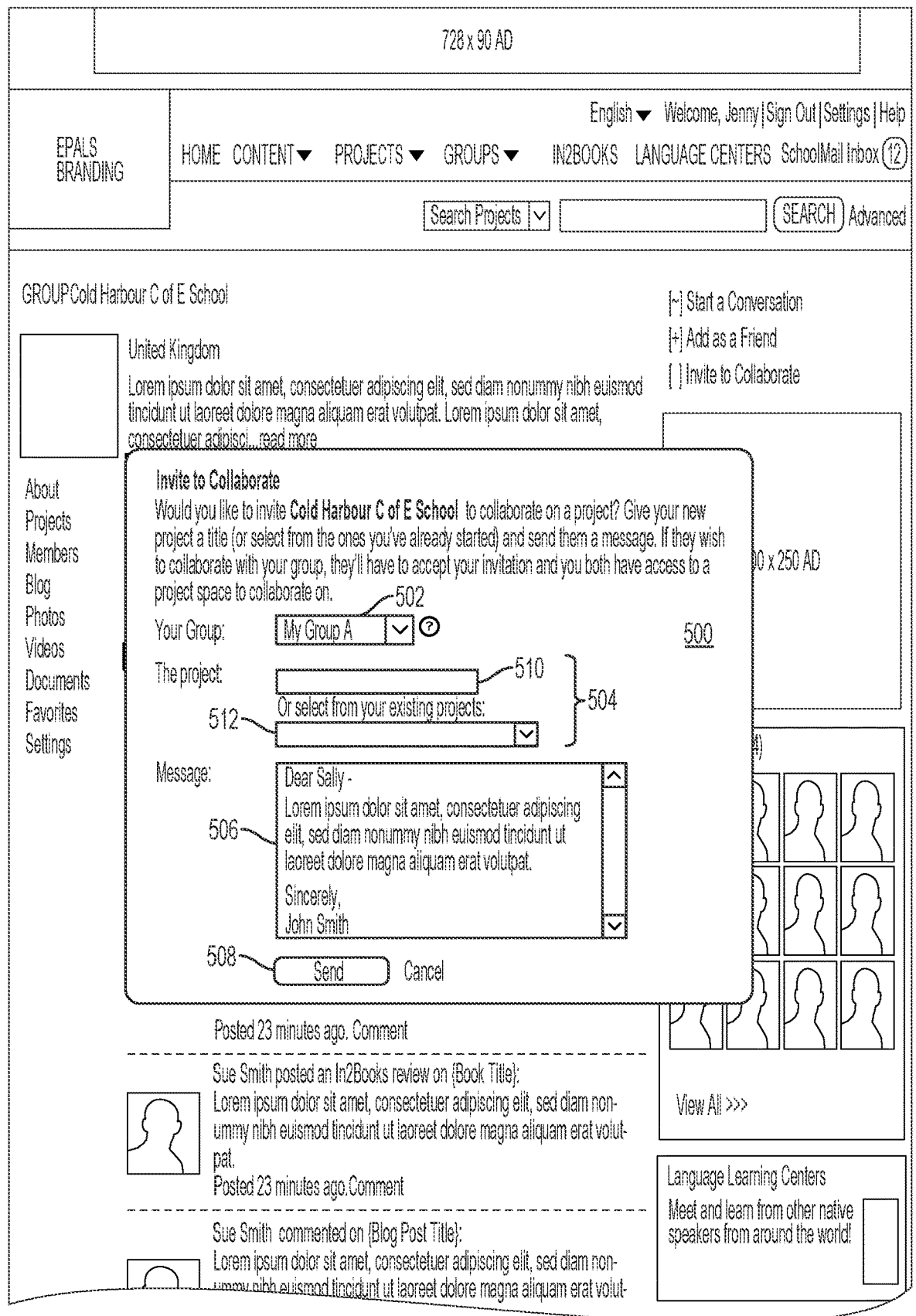
Figure 6:
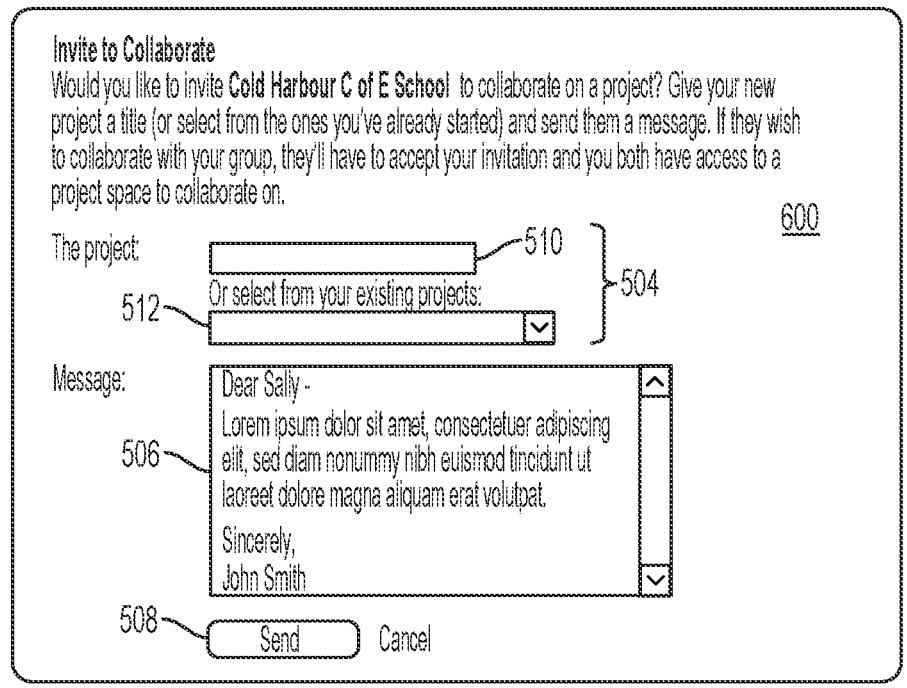
Figure 7:
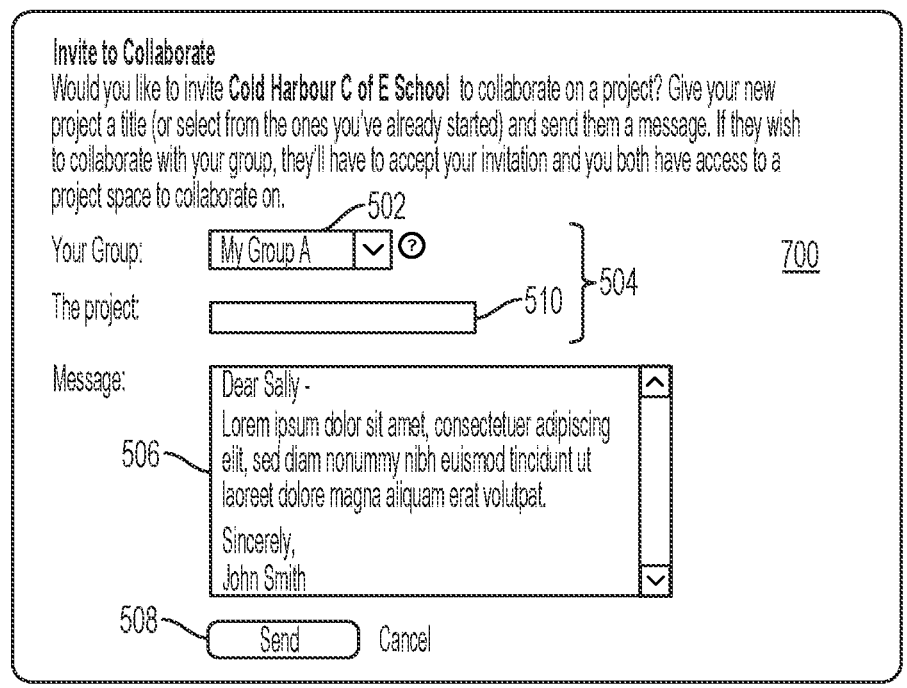
Figure 8:
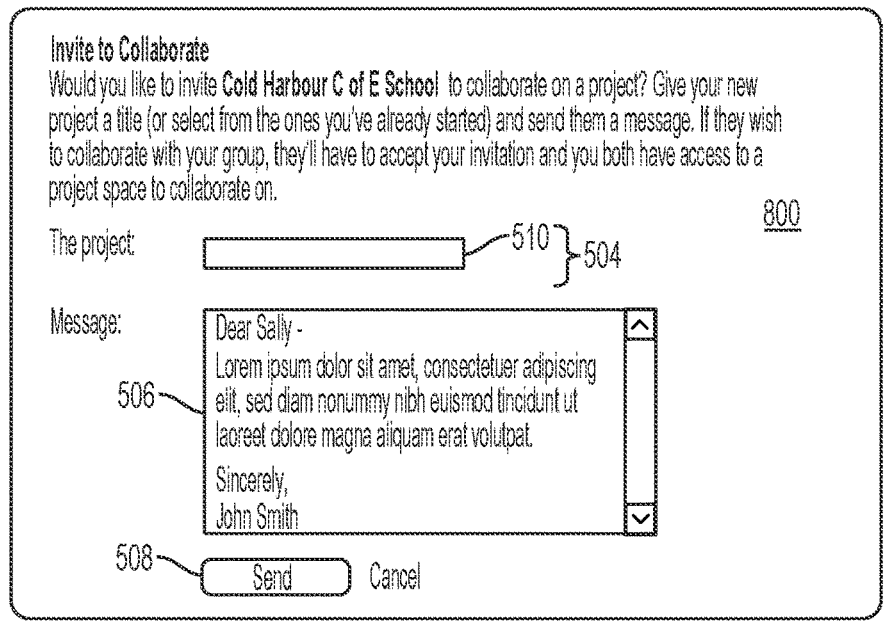

At step 212, system 100 presents the first user with hyperlink 310 (FIGS. 3 and 4) labeled "Invite to Collaborate." In order to invite the second group to participate in a collaboration group or project, the first user activates hyperlink 310 using computer 102 via either GUI 300 or 400. At step 214, system 100 presents a form configured to allow the first user to provide details to the second group regarding the nature of the requested collaboration. For example, FIG. 5 illustrates an exemplary GUI 500 for inviting a group to join a collaboration group. GUI 500 comprises a group selection box 502, a collaboration selection area 504, a message area 506, and an activation button 508. Collaboration selection area 504 comprises a collaboration title freeform text box 510 and a collaboration selection dropdown 512. The collaboration selection dropdown 512 contains a list of projects that may be of interest to both parties. When a user activates hyperlink 310 (FIGS. 3 and 4), GUI 500 is displayed. The user selects a group for which the user is responsible that is to participate in the collaboration using group selection box 502. For instance, "My Group A" is a group for which the user accessing GUI 500 is responsible, as illustrated in FIG. 5. The first user then selects a collaboration group/project using collaboration selection area 504. That is, if the first user desires to create a new collaboration group or project, the user provides a title for the collaboration group/project in collaboration title freeform text box 510. Otherwise, the first user selects a preexisting collaboration group/project using collaboration selection dropdown 512. The first user then provides any additional information to be sent to the second group using message area 506. Once GUI 500 is complete, the first user selects activation button 508 at step 214.

Depending on the first user's configuration, other exemplary GUIs may be presented to the user in place of GUI 500. For instance, if the first user is not currently an administrator for any group, GUI 600 (FIG. 6) is presented to the user. For this reason, GUI 600 does not include group selection box 502 (FIG. 5). If the first user is a member or admin of a group but is not currently participating in any collaboration groups or projects, GUI 700 (FIG. 7) is presented to the user. For this reason, GUI 700 does not include collaboration selection dropdown 512. It should be understood that the first user still has the ability to create a collaboration group or project using collaboration title free-form text box 510. If the first user is currently neither part of a group nor participating in any collaboration groups or projects, system 100 presents GUI 800 (FIG. 8) to the first user via computer 102.

Figure 9:
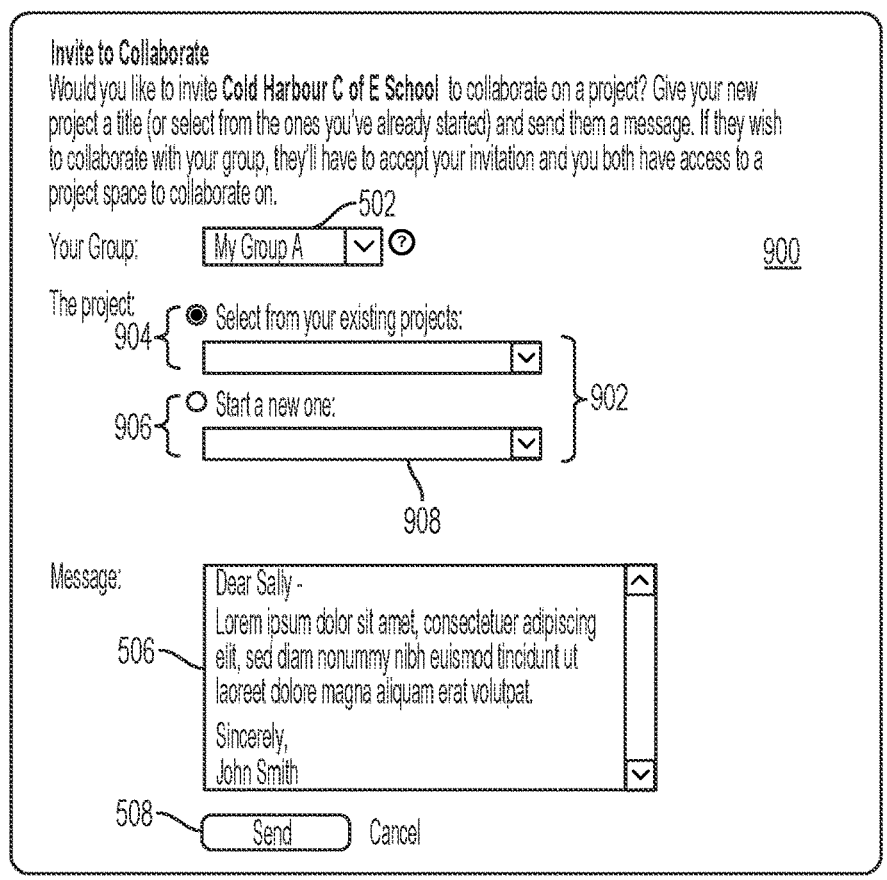
Figure 10:
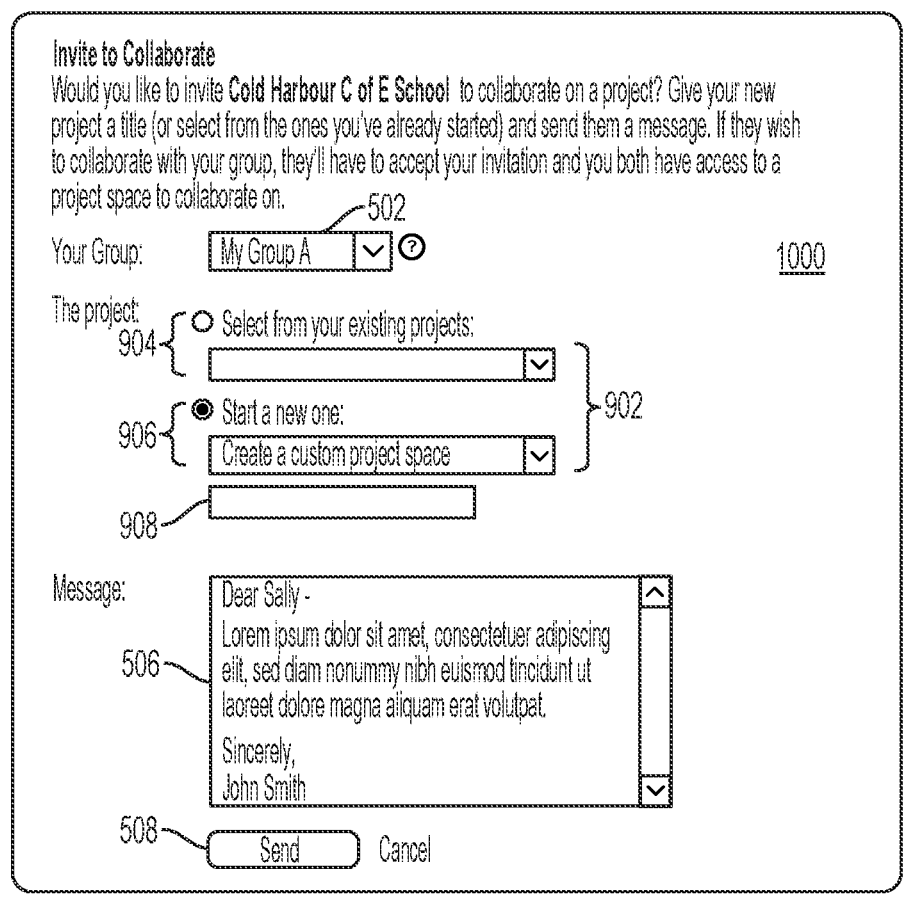

In another embodiment, the form presented by system 100 and configured to allow the first user to invite another group to participate in a collaboration group or project is configured to allow the user to define a collaboration space. Referring to FIG. 9, for instance, GUI 900 comprises areas 502 and 506 and button 508 as described above with respect to FIG. 5. However, GUI 900 further comprises a template selection area 902 configured to allow the first user to define a collaboration space. A previous selection area 904 of GUI 900 allows the user to select from preexisting templates or collaboration spaces with which the first user has previously been associated. A new selection area 906 allows the user to define a new template or collaboration space. The first user may supply a name for the new collaboration space using a title textbox 908. FIG. 10 illustrates a GUI 1000 similar to GUI 900 but demonstrating the selection of new selection area 906.

FIG. 11 illustrates a GUI 1100 presented by system 100 informing the first user that the invitation described above has been transmitted to the second group.

Figure 12:
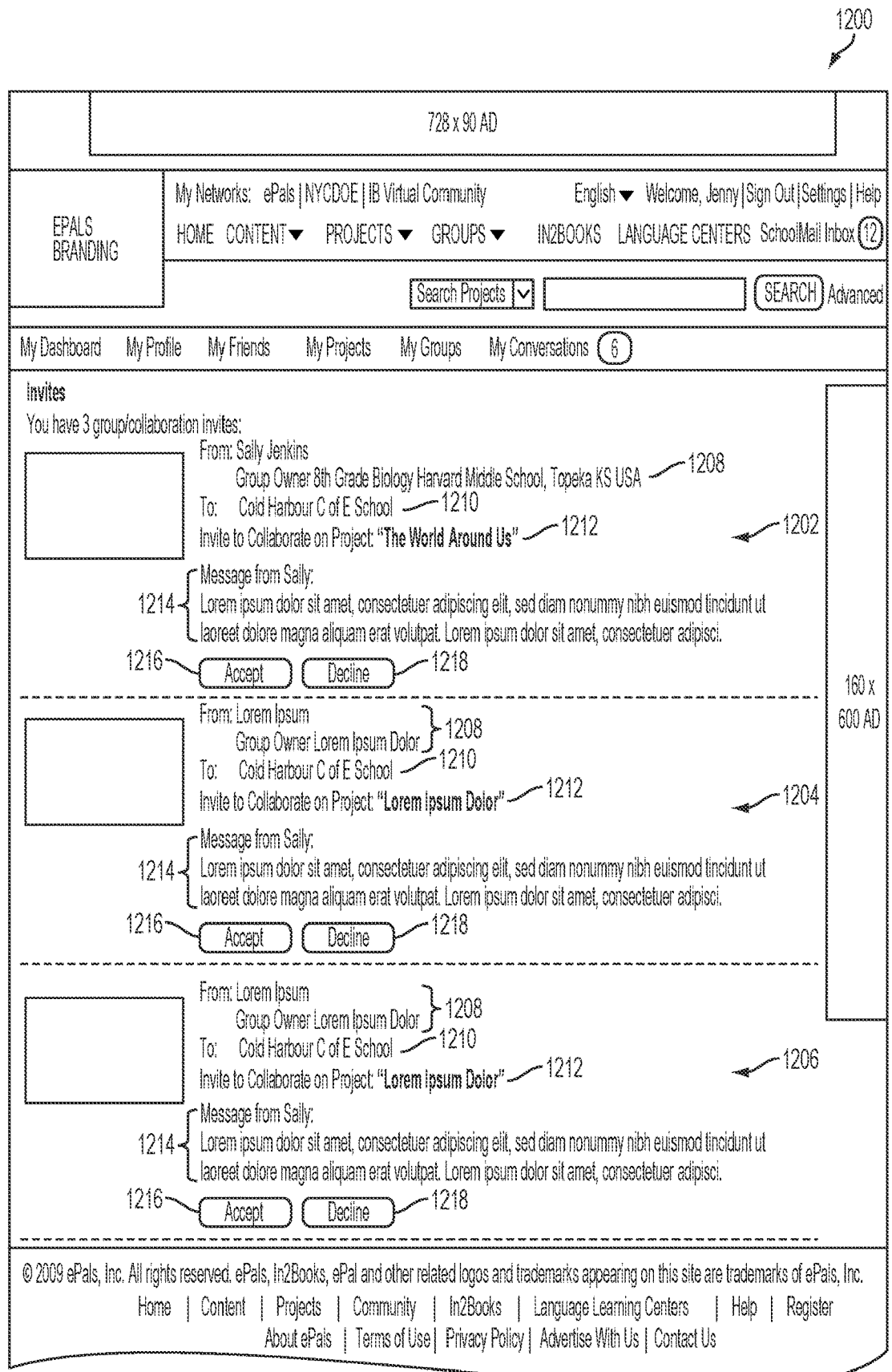

At step 216, system 100 sends the collaboration invitation via computer 118, for example, to the second user tasked with administration of the identified group, i.e., the Group B Owner. The invitation includes the details regarding the nature of the requested collaboration as explained above. At step 218, Group B Owner receives the collaboration invitation and decides whether to accept the invitation. Referring to FIG. 12, for example, a GUI 1200 is presented to the second user. GUI 1200 is configured to present any pending invitations directed to the second user. In this example, for instance, multiple invitations 1202, 1204, and 1206 are presented to the second user, although it should be understood that the second user may not be presented with any invitations or may be presented with a single invitation when using GUI 1200.

Each of invitations 1202, 1204, and 1206 comprises a sender section 1208, a recipient section 1210, an invitation section 1212, a message section 1214, an accept button 1216, and a decline button 1218. Sender section 1208 identifies the user and/or the group from which the invitation originated. The recipient section 1210 identifies the user and/or group to which the invitation was directed, which will generally be the second user or a group administered by the second user. Invitation section 1214 indicates that the invitation is to request participation in a collaboration group or project and identifies the name of the group or project. Message section 1214 sets forth any message created by system 100 and/or created or modified by the first user, thereby providing the second user with information about the invitation and/or the desired collaboration group or project. The second user may accept an invitation by selecting accept button 1216 or may decline an invitation by selecting decline button 1218.

Figure 13:
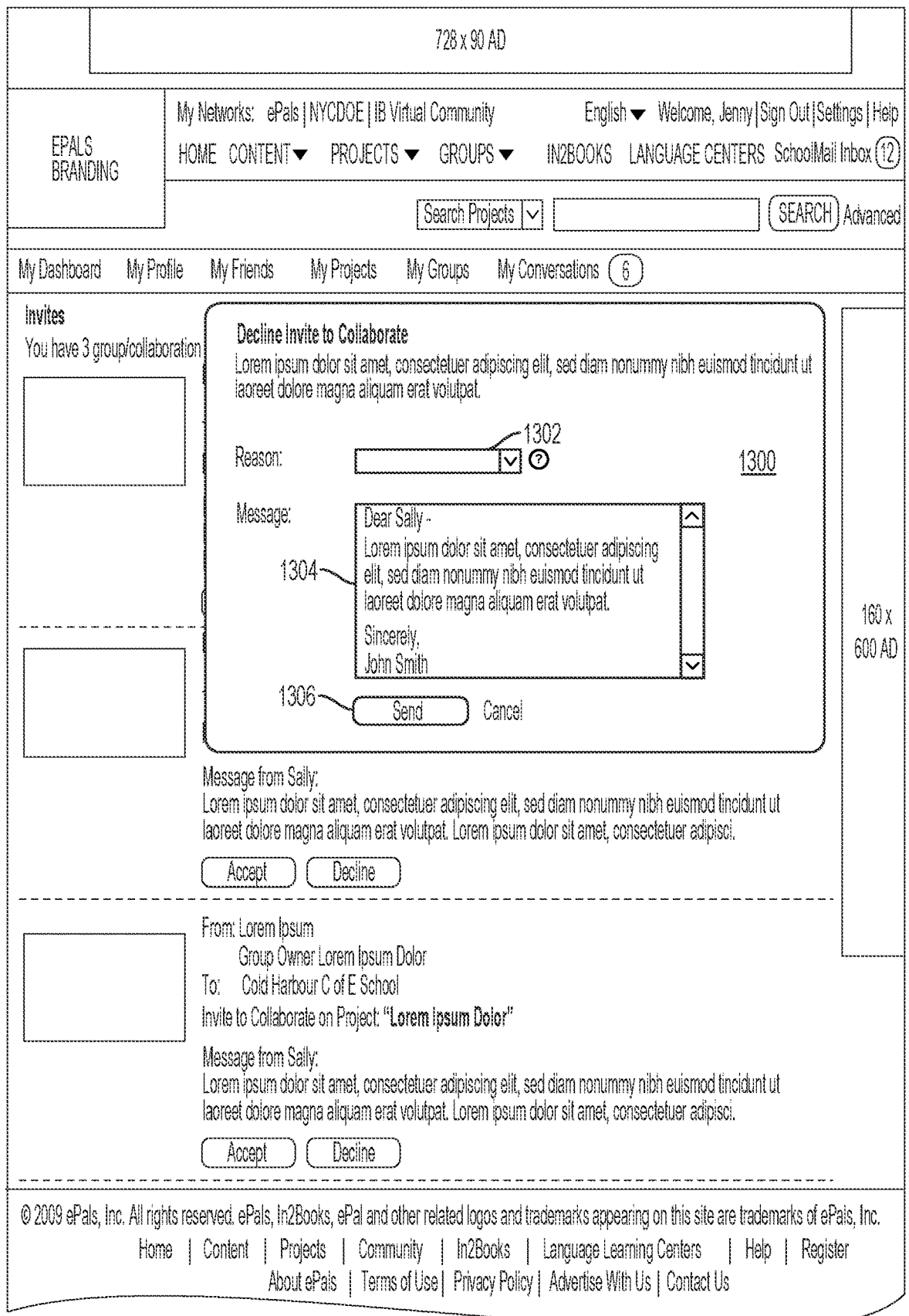

If the second owner declines the invitation at step 218, process flow proceeds to step 220. In one embodiment, system 100 presents the second owner with a form configured to allow the second user to send a message to the first user explaining why the invitation to collaborate was not accepted. Referring to FIG. 13, for instance, a GUI 1300 is configured to provide the second user with the ability to explain the rationale or provide a reason the invitation from the first user was declined. GUI 1300 comprises a reason dropdown box 1302, a reason text area 1304, and a send button 1306. Reason dropdown box 1302 allows the second user to select a predefined reason or a category of reason why the invitation was declined. For instance, dropdown box 1302 may include reasons the recipient group is unable to collaborate, such as the teacher or students within the group are engaged in a foreign exchange program or sabbatical and are out of the country. Reason text area 1304 allows the second user to create a message to the first user explaining the rationale or reason the invitation was declined. Activation of send button 1306 transmits the information contained within GUI 1300 to the first user as described in more detail below.

If the second user decides to send the message, system 100 transmits the message to the first user at step 222. If so, the first user receives the message containing an explanation of why the invitation to collaborate was declined and the process terminates at step 222.

Figure 14:
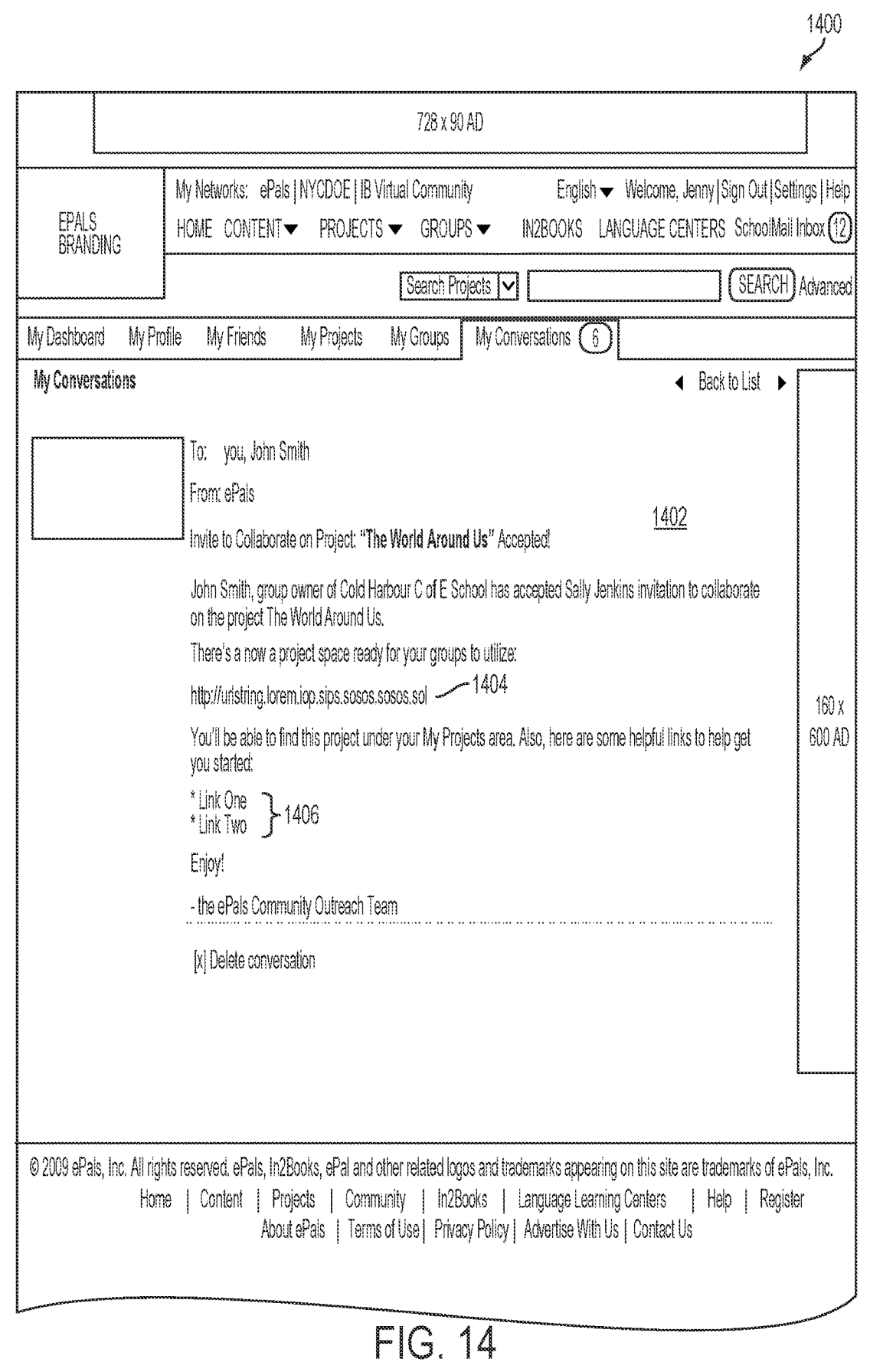

If the second user accepts the invitation at step 218 by selecting accept button 1216 (FIG. 12), process flow proceeds to step 224, where system 100 generates a new collaboration group. System 100 makes the first and second users co-owners of the new collaboration group and sends a message to each owner confirming the creation of the group and providing a hyperlink to the new collaboration group. At step 226, system 100 also sends messages to each of the new collaboration group's members containing a link to the new collaboration group. Additionally, system 100 adds the new group to each owners' and members' "My Groups" roster, so that each user can keep track of the collaboration group or project. Referring to FIG. 14, for instance, a GUI 1400 is configured to provide the first and second users with the information described above. GUI 1400 comprises a message 1402 that includes a hyperlink 1404 to the newly created collaboration space, as well as one or more hyperlinks 1406 to help the co-owners get started. For instance, these links may be configured to navigate the users to webpages or documents established to facilitate creation and activation of the collaboration group. That is, the links may direct the users to a collaboration instruction guide, to a collaboration group frequently asked questions list, or to a help area or forum.

At step 228, the first user is able to invite additional members to the new collaboration group via computer 102. At step 230, the second user is likewise able to invite additional members to the new collaboration group via computer 118. Process flow then proceeds to step 240 where system 100 is configured to allow the groups (Group A and Group B) to collaborate.

Figure 15A:
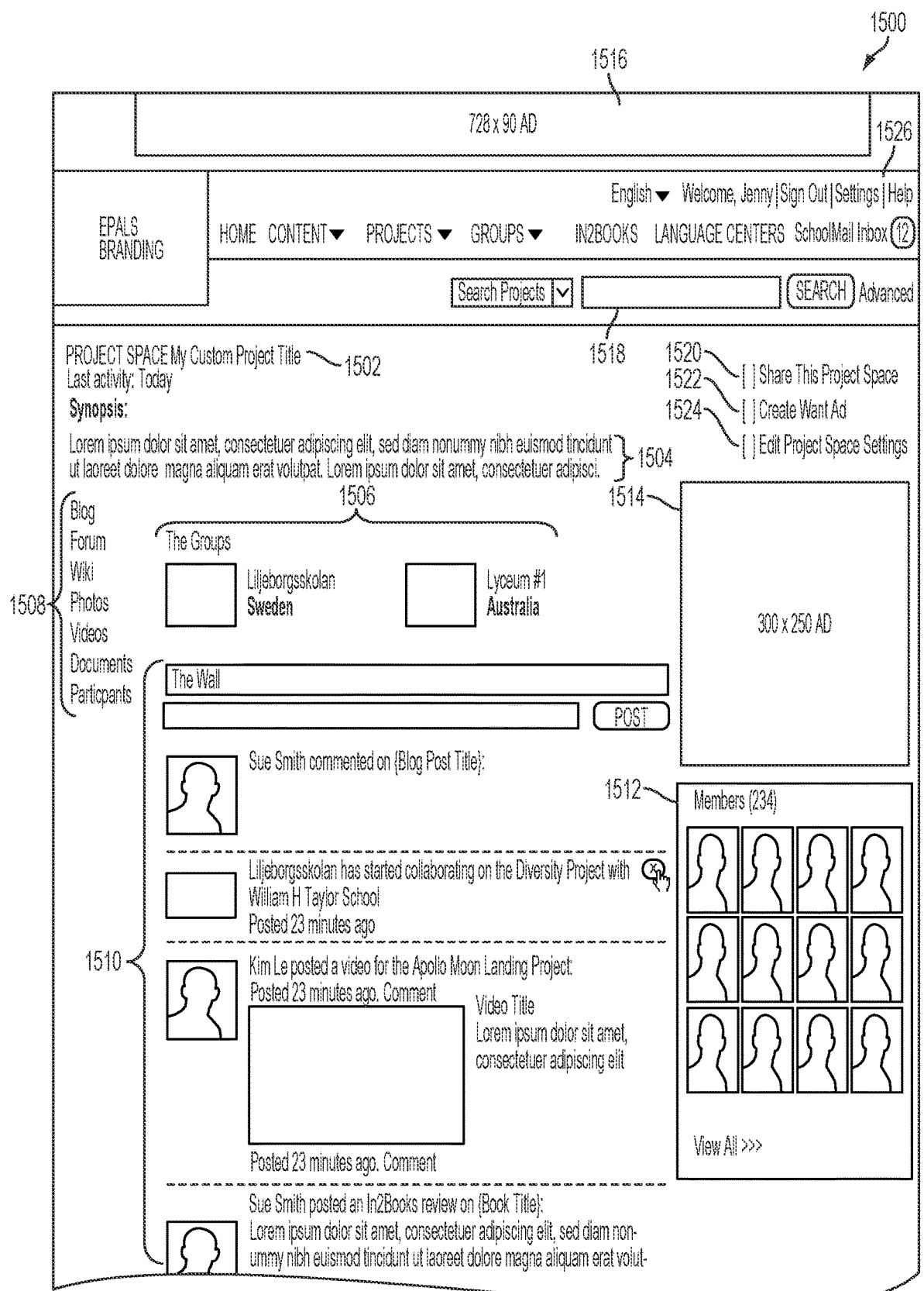

FIG. 15 (which includes and extends across FIGS. 15A and 15B) illustrates an exemplary GUI 1500 configured to facilitate collaboration by the groups within the new collaboration group or project. GUI 1500 comprises a title bar 1502, a synopsis area 1504, a group identification area 1506, a functional selection area 1508, a discussion area 1510, and a member identification area 1512. Title bar 1502 indicates the name of the collaboration group or project, while synopsis area 1504 provides a brief overview of the goal or objective of the group or project. Group identification area 1506 identifies the groups that are members of the collaboration group or project. Functional selection area 1508 allows members of the group to navigate to other sections of the project space in order to utilize other technology, such as blogs and wikis, and to upload multimedia, such as photographs and videos, or documents and other material for use by members of the group/project. Discussion area 1510 reflects an ongoing discussion by the members of the group, and member identification area 1512 identifies the current members of the collaboration group or project.

It should be understood that GUI 1500 may include additional components, such as locations 1514 and 1516 configured to present and display advertisements to the users. GUI 1500 may further comprise a search box 1518 in order to allow a user to search for other members, groups, collaboration groups, projects, or other components of system 100. GUI 1500 may also comprise hyperlinks 1520 and 1522. Hyperlink 1520 is configured to allow a user to save the current configuration of the collaboration space, while hyperlink 1522 is configured to navigate the user to a portion of system 100 where the user can post a request for an item, service, information, or other material. If the current user is a co-owner of the collaboration group, hyperlink 1524 becomes accessible. Hyperlink 1524 allows the co-owner of the collaboration group to edit the settings and configurations for the project space, as described below. As should be appreciated, GUI 1500 may comprise additional components, such as a taskbar 1526 providing the user with access to other aspects of system 100.

Figure 16:
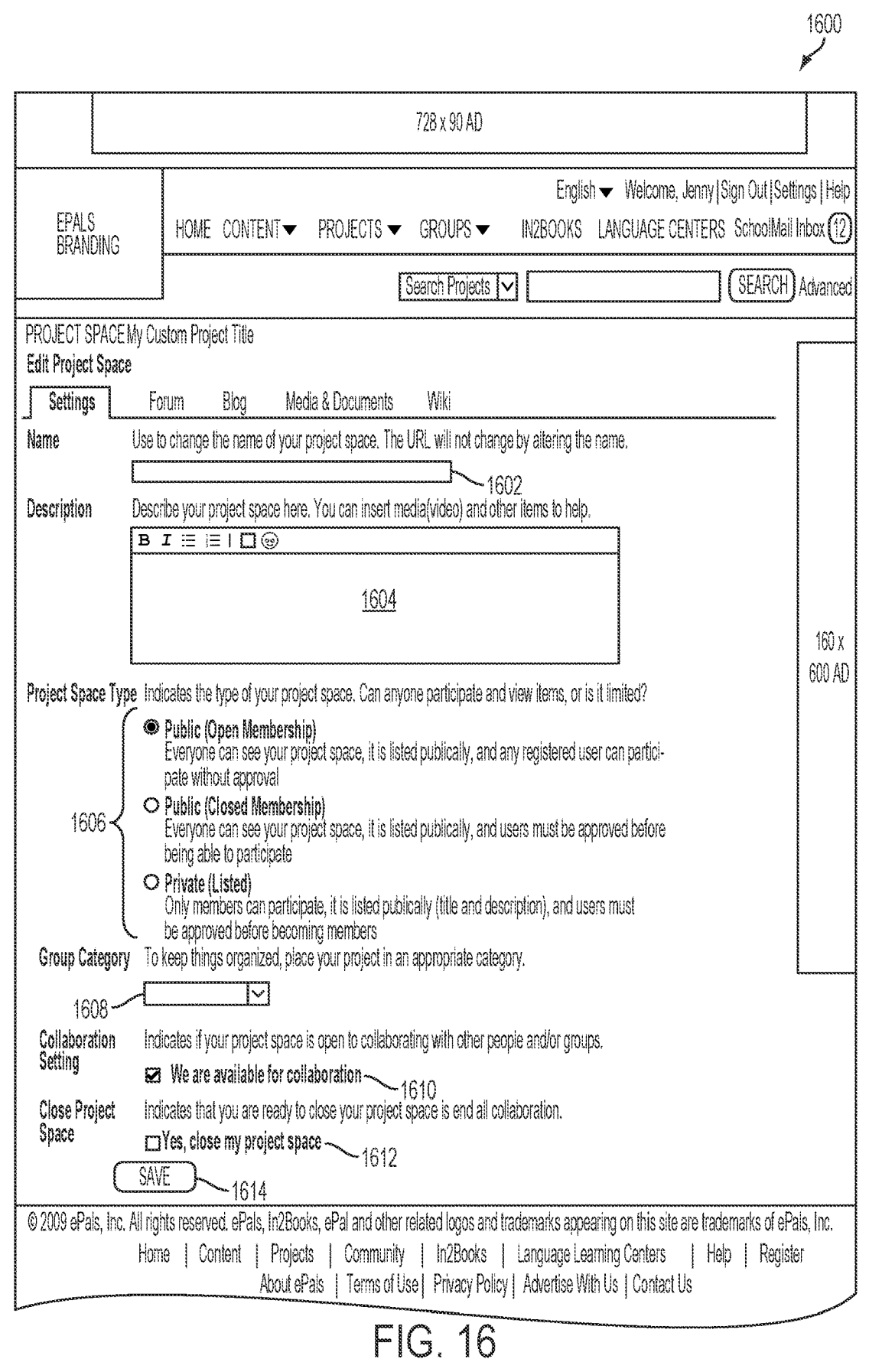

FIG. 16 illustrates a GUI 1600 configured to allow each co-owner of a project space to edit the space's settings. In this embodiment, GUI 1600 is accessed when the co-owner activates hyperlink 1524 (FIG. 15). GUI 1600 comprises a title box 1602, a text box 1604, type selection radio buttons 1606, a category selection 1608, a collaboration setting 1610, a close box 1612, and a save button 1614. The co-owner may change the title of the collaboration project using title box 1602 or the synopsis/description of the project using text box 1604. Using type selection radio buttons 1606, the co-owner can determine whether the collaboration group or project is "open participation" (allowing any member of system 100 to participate in the collaboration group), "closed participation" (allowing any member of system 100 to view the group or project but requiring each member to be approved before participating), or "private" (allowing only members that are already part of the collaboration group or project to participate). Category selection 1608 allows the co-owner to assign the project space to a category for organization purposes, as explained above. Collaboration setting 1610 allows the co-owner to select whether the collaboration group or project is also available for collaboration with other groups or projects. Either co-owner may close the collaboration group or project by selecting close box 1612. After making any changes or modifications described above, the co-owner saves the changes and settings by activating save button 1614. GUI 1600 comprises other components similar to those described above with respect to GUI 1500 of FIG. 15.

The description that follows provides a specific example of the use of system 100 in order to collaborate in an educational context. Sally Smith is a ninth grade biology teacher in Louisiana who has an online social networking-style group for each of her six classes. Each of her students is a member of their period's class group, and Ms. Smith is the owner of each group. Ms. Smith is interested in finding another biology class in a different part of the country with whom her class can collaborate on a project around local habitats. Through her search, she discovers Mr. Sanchez's ninth grade biology class in Oregon. By viewing the content on Mr. Sanchez's class's group page, she sees that they too are interested in studying local habitats. Ms. Smith sends an invitation to Mr. Sanchez, in order to let him know of her interest in forming a collaboration group with his class. Mr. Sanchez sees the value in such collaboration but does not want outside students added to his classroom group. He feels this would be inappropriate for many reasons, such as whether it is a potential security violation against his own school's Internet use policy. However, in the presently-described embodiment, if Mr. Sanchez accepts the invitation, no members would be added to his group or to his school's system, but rather, a new collaboration group would be created purely for the purpose of this collaboration. Accordingly, Mr. Sanchez accepts Ms. Smith's invitation. System 100 sends both teachers a message welcoming them into their new collaboration group. Next, both teachers activate the hyperlink in their respective message and are directed to their new collaboration group by system 100. Both teachers are listed as co-owners of the new group, which has the name of the "Local Habitats Project," as suggested by Ms. Smith in the invitation. Additionally, the students from the teachers' respective classes are also now part of the new group. However, the students are identified as members of the new collaboration group, not as owners. Both classrooms and groups in their respective systems remained unchanged. That is, Ms. Smith's class and Mr. Sanchez's class on their respective school systems remain unchanged. The homepage or log-in screen configured for use by Mr. Sanchez now includes the "Local Habitats Project" group listed in his "My Groups" area alongside his original class group and all of the other groups he had already been a part of.

The description that follows provides a specific example of the use of system 100 in order to collaborate in a social networking context. Two hypothetical "environmentally focused" groups on a social networking site—the DC Greens group and the Northern Virginians for Clean Air ("NVCA") group—are both interested in similar causes. The DC Greens leader and group owner, Sarah, wants to promote an awareness campaign in the nation's capital called "Get On Board" to encourage area residents to take public transportation. She realizes that her group alone is not enough to pull off a campaign as large as what she has envisioned. She needs help and wants to look for other local like-minded groups to help. She searches the social networking website and finds the NVCA group. In this example, NVCA is a far larger group than the DC Greens. This concerns Sarah, because she does not want to be overwhelmed or to lose control of her idea or group. Upon further investigation, Sarah sees that by inviting NVCA to collaborate she would not be required to invite all its members to join her DC Greens relatively smaller group. She realizes that, instead, she can create a new collaboration group just for this collaboration. Accordingly, she invites the NVCA group to the collaboration group by activating the "Invite to collaborate" hyperlink described above. She includes a description of what she hopes to accomplish and sends the invitation. System 100 transmits a message to the NVCA group owner, Paul. In this example, Paul has been thinking that the DC area needs a campaign like the "Get On Board" campaign, so he accepts the invitation. Upon Paul's acceptance, the social networking system creates the "Get On Board" group or project, identifying both Sarah and Paul as the group owners. Sarah and Paul then connect through on-site messaging to discuss their plans and strategy for adding members of their existing groups to the new collaboration group.

It should be understood that Paul and Sarah may invite individual members from their respective groups at this time or may invite their entire respective groups. It should be further understood that, regardless of which members join the new collaborative group, the original groups remain unchanged.

Once the "Get On Board" campaign has been completed, Sarah and Paul decide that they would like to dissolve the "Get On Board" group, which they do using system 100. Sarah and Paul continue to administer/own the DC Greens and NVCA groups, respectively. All the members of the original groups that became members of the "Get On Board" group remain as members of those original groups.

Figure 17:

FIG. 17 illustrates an exemplary GUI for creating a group. In the Project Collaboration area of the GUI, the group creator may select the radio button labeled "Yes" to enable the group to participate in collaborations or collaboration groups. Otherwise, the group creator may select the "No" option so that the group is not available for collaboration. Activating the checkbox labeled "Advanced Options" navigates the group creator to the exemplary GUI illustrated by FIG. 18.

Figure 18:
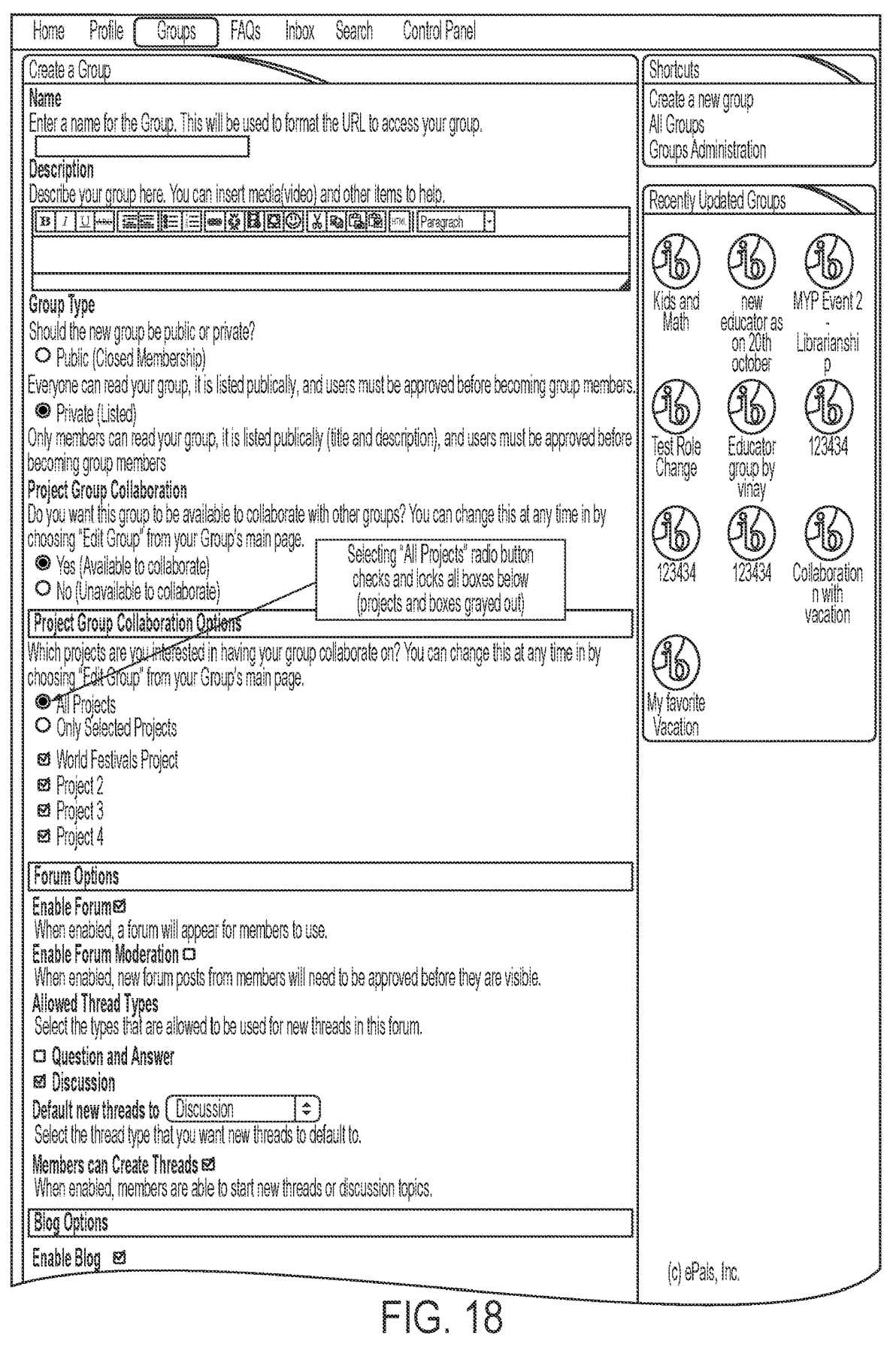

FIG. 18 illustrates an exemplary GUI presented when the "Advanced Options" checkbox is selected using the GUI described above with respect to FIG. 17. Selecting the "All Projects" radio button under the "Project Group Collaboration Options" via the GUI enables the group to collaborate on all projects in the system. Alternatively, selecting the "Only Selected Projects" radio button enables the group creator to select which projects associated with the creator and/or the group that the group will be able to collaborate. Selecting this radio button causes the exemplary GUI illustrated by FIG. 19 to be presented to the group creator.

Referring to FIG. 19, once the "Only Selected Projects" radio button is selected, the GUI presents a checkbox, a title, and a "learn more" hyperlink for each identified project. The title identifies the corresponding project, while selecting the associated checkbox enables the group to collaborate with respect to the project. Hovering the mouse pointer and/or selecting the "learn more" hyperlink causes the GUI to present additional information corresponding to the identified project to the user. The additional information may be presented by any manner understood by those in the art, such as a pop-up box or by navigating to a different webpage.

It should be understood to those of ordinary skill in the art that the above description discloses a process for group collaboration in an educational or social networking environment that does not impair or compromise the structure or organization of the original or underlying groups. It should be further understood that other methods of group collaboration or sequences of actions for group collaboration are contemplated by the process described above without departing from the scope of the present invention. For instance, a collaborative group may be initiated or established prior to requesting preexisting groups to join the collaboration group. Alternatively, one group may establish a collaborative group and then request other groups to join. Once dissolved, the collaborative group does not affect or compromise the structure of the original groups, which remain intact.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for facilitating collaboration in a social network or in a social-networking style group between a first group comprising at least two members and owned by a first group owner, who may be one of the at least two members and a second group comprising at least two members and owned by a second group owner who may be one of the at least two members, the method comprising the steps of:

creating within the social network or social-networking style group a dedicated collaboration group for collaborating on a particular event or project, based at least in part on an invitation to collaborate from one of the first group owner or the second group owner defining the purpose of the dedicated collaboration group and the acceptance of the invitation from the other of the first group owner or the second group owner, whereupon the first group owner and the second group owner become co-owners of the dedicated collaboration group and wherein a processing device stores data representative of the dedicated collaboration group in a memory operatively connected to the processing device and identifies the dedicated collaboration group as a group distinct from the first group and the second group;

linking the first group of at least two members to the dedicated collaboration group, wherein the processing device stores data in the memory representative of the link between the first group and the collaboration group;

linking the second group of at least two members to the dedicated collaboration group, wherein the processing device stores data in the memory representative of the link between the second group and the collaboration group in the memory;

facilitating collaboration on the purpose of the dedicated collaboration group by the first and second groups that are linked to the dedicated collaboration group, wherein a first structure of the first group remains unchanged by linking of the first group to the dedicated collaboration group and a second structure of the second group remains unchanged by linking of the second group to the dedicated collaboration group.

* * * * *